US008857701B2

(12) United States Patent
Mandreucci et al.

(10) Patent No.: US 8,857,701 B2
(45) Date of Patent: Oct. 14, 2014

(54) CONVERTIBLE FOOD TRANSPORTING BOX AND METHOD

(75) Inventors: Marcello Mandreucci, Robbinsville, NJ (US); Andrew DePascale, Hamilton, NJ (US); Robert Petner, Burlington, NJ (US)

(73) Assignee: Innovative Pizza Products LLC, Robbinsville, NJ (US)

( * ) Notice: Subject to any disclaimer, the term of this patent is extended or adjusted under 35 U.S.C. 154(b) by 175 days.

(21) Appl. No.: 13/402,967

(22) Filed: Feb. 23, 2012

(65) Prior Publication Data

US 2013/0126593 A1 May 23, 2013

Related U.S. Application Data

(60) Provisional application No. 61/629,660, filed on Nov. 23, 2011.

(51) Int. Cl.
*B65D 5/52* (2006.01)
*B65D 5/66* (2006.01)
*B23P 17/00* (2006.01)
*B65D 51/24* (2006.01)

(52) U.S. Cl.
CPC . *B23P 17/00* (2013.01); *B65D 5/66* (2013.01); *B65D 51/24* (2013.01); *Y10S 229/906* (2013.01)
USPC ............ 229/104; 206/45.21; 206/45.23; 206/45.25; 206/45.26; 229/906

(58) Field of Classification Search
USPC ............ 229/104, 902, 906; 206/45.21, 45.23, 206/45.24, 45.25, 45.26; 248/152, 174, 459
See application file for complete search history.

(56) References Cited

U.S. PATENT DOCUMENTS

| | | | | | |
|---|---|---|---|---|---|
| 2,317,203 | A | * | 4/1943 | Kurhan | 206/45.23 |
| 3,071,307 | A | * | 1/1963 | Keller | 229/104 |
| 3,645,382 | A | * | 2/1972 | Abrams | 206/45.21 |
| 4,718,545 | A | * | 1/1988 | Chrzanowski et al. | 206/45.24 |
| 4,801,774 | A | * | 1/1989 | Hart | 229/104 |
| 7,793,821 | B2 | * | 9/2010 | Oliveira | 229/104 |
| 2003/0062406 | A1 | * | 4/2003 | Lizzio | 229/906 |
| 2003/0106926 | A1 | * | 6/2003 | Beatificato et al. | 229/104 |
| 2006/0226206 | A1 | * | 10/2006 | Reap | 229/906 |
| 2009/0314661 | A1 | * | 12/2009 | Fisher et al. | 206/45.21 |
| 2011/0259765 | A1 | * | 10/2011 | Gunnett | 206/45.23 |

* cited by examiner

*Primary Examiner* — Gary Elkins
(74) *Attorney, Agent, or Firm* — Stuart M. Goldstein

(57) ABSTRACT

A convertible food transporting box consists of a single blank which, when appropriately folded, serves the dual purposes of transporting food, i.e. pizza, and elevating the box for displaying and serving the pizza. The lid section of the box has a plurality of perforated inserts as part of the lid section itself. When used to transport pizza or like food, the box is a standard pizza box type container. To convert the box to an elevated food display and serving tray, the perforated inserts are pushed out of and locked to the lid section, such that they extend outwardly from the lid section. The lid section is then rotated to a position beneath the container section, such that the extended inserts act as legs to support the box, now converted to a food tray.

11 Claims, 5 Drawing Sheets

CONVERTIBLE FOOD TRANSPORTING BOX AND METHOD

RELATED APPLICATION

The herein application claims the benefit of provisional utility application Ser. No. 61/629,660 filed on Nov. 23, 2011.

BACKGROUND OF THE INVENTION

Pizza pies are routinely packaged and delivered in the flat cardboard boxes with which most consumers are familiar. A typical box consists of the relatively large, open main container section, two to three inches in depth, in which the pizzas are placed, and large lids which are connected to the container section and serve to enclose the pizzas within the boxes. This type pizza box, used for years, is perfectly suited for safely housing, protecting, transporting, and delivering pizzas. However, the box is not particularly accommodating in the post-delivery process. Once the box's lid is pulled back and the box is opened, access to and retrieval of the pizza itself presents certain annoying challenges. Reaching into the box to lift out a hot pizza presents several obvious problems, as does where to put the pizza once it is removed from the box. If the pizza is left in the box, the box most often remains on the table while individual slices of pizza are awkwardly removed. The size of the box itself, especially when the lid is open, takes up a large amount of space. This usually results in the lid being haphazardly ripped off, causing an unsightly torn box, disruption of the pizza in the box, and loose scattered pieces of ripped cardboard.

SUMMARY OF THE INVENTION

It is thus the object of the present invention to overcome the limitations, disadvantages and challenges presented by the packaging and transporting of foods, particularly pizzas, in their boxes or enclosures.

It is the object of the present invention to provide a convertible food transporting box which serves the dual purpose of transporting pizza or similar type food and elevating the box for displaying and serving the pizza.

It is another object of the present invention to provide a convertible food transporting box which can be quickly and efficiently converted from a flat pizza type box to an elevated food display and serving tray.

It is still another object of the present invention to provide a convertible food transporting box consisting of a single blank which is easily and simply folded from a box to an elevated food display and serving tray.

It is a further object of the present invention to provide a convertible food transporting box which is economical to manufacture in mass quantities and, in fact, can be manufactured for the same cost as a standard pizza box.

These and other objects are accomplished by the present invention, a convertible food transporting box consisting of a single blank which, when appropriately folded, serves the dual purposes of transporting food, i.e. pizza, and elevating the box for displaying and serving the pizza. The lid section of the box has a plurality of perforated inserts as part of the lid section itself. When used to transport pizza or like food, the box is a standard pizza box type container. To convert the box to an elevated food display and serving tray, the perforated inserts are pushed out of and locked to the lid section, such that they extend outwardly from the lid section. The lid section is then rotated to a position beneath the container section, such that the extended inserts act as legs to support the box, now converted to a food tray.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
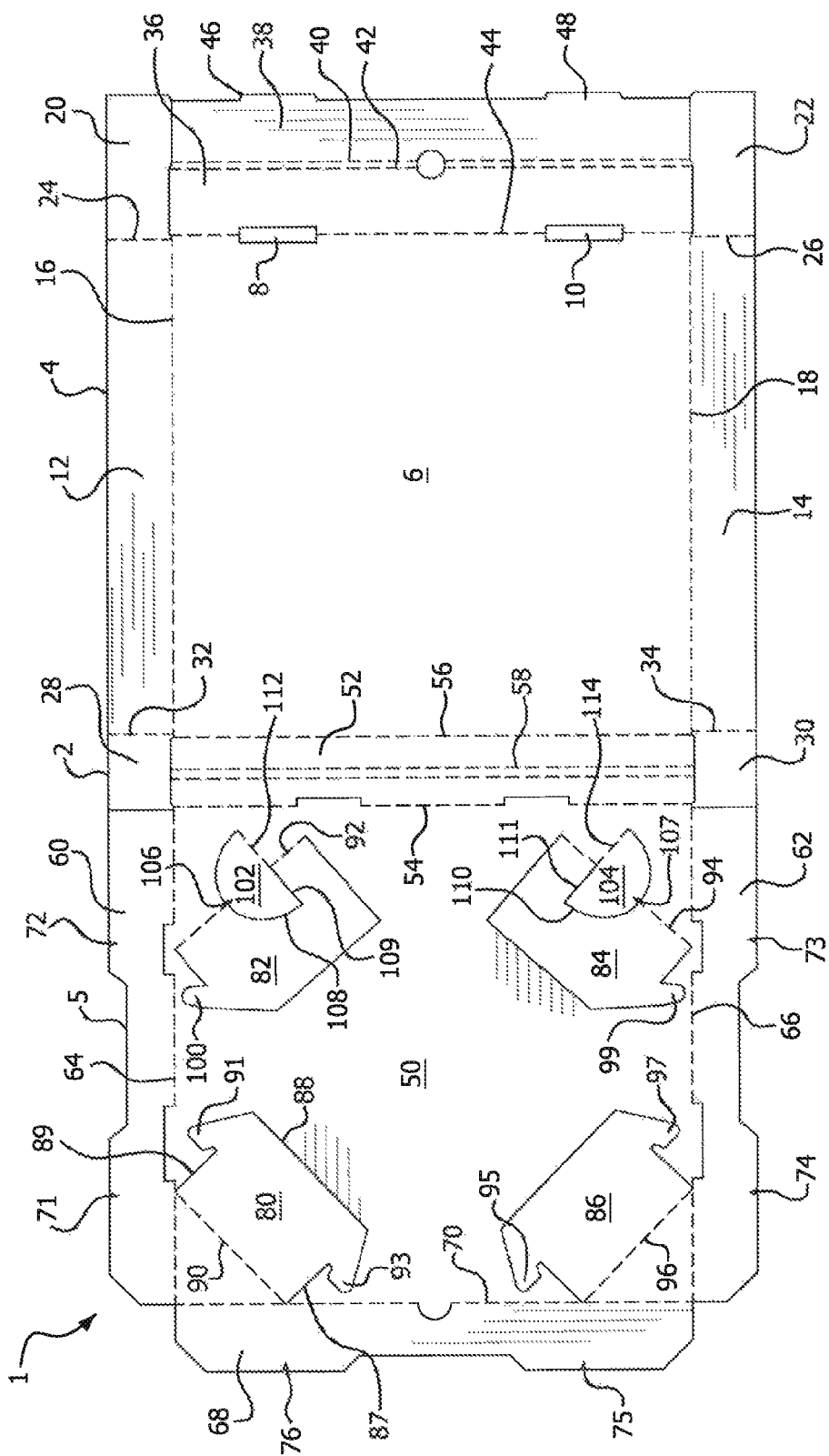
FIG. 1 is a top view of the inner surface side of the open blank of the convertible food transporting box of the present invention.

Convertible food transporting box 1 of the present invention comprises flat blank 2. It is critical that blank 2 be made of a rigid cardboard, or equivalent material, which allows the blank to be folded, but still retain its integrity and rigidity. The type of cardboard commonly utilized for commercial flat pizza boxes is representative of the type of material which is contemplated.

Blank 2 has food container section 4 and lid section 5. Container section 4 is substantially identical to the food containing sections of pizza boxes currently in use, in that it comprises floor section or member 6 with slotted openings 8 and 10, side walls 12 and 14 attached to the floor member via fold lines 16 and 18, front flaps 20 and 22 attached to the side walls via fold lines 24 and 26, rear flaps 28 and 30 attached to the side walls via fold lines 32 and 34, front walls 36 and 38 connected to each other via fold lines 40 and 42 and to the floor member via fold line 44, and tabs 46 and 48 extending from front wall 38.

Lid section 5 comprises flat top section member 50, connected to container section 4 by intermediate wall member 52 via fold lines 54 and 56. Double line fold hinge joint 58 extends the length of intermediate wall member 52. Side walls 60 and 62 are connected to top member 50 via fold lines 64 and 66. Rear wall 68 is connected to top member 50 via fold line 70. Short slits 71, 72, 73, 74, 75, and 76 are located within side walls 60 and 62 and rear wall 68.

Inserts 80, 82, 84, and 86 are located within and form a portion of flat top member 50 of lid section 5. Each insert is attached to top member 50 by perforations on three sides (designated at 87, 88, 89 only as to insert 80—each insert having identical perforated sides as shown in the FIGs.) and attached via fold lines 90, 92, 94, and 96. Inserts 80 and 86 have locking tabs 91 and 93 and 95 and 97. Inserts 82 and 84 have locking tabs 99 and 100.

Also forming a portion of top member 50, albeit a small section thereof, are insert support tabs 102 and 104, which partially extend into inserts 82 and 84. Support tabs 102 and 104 have smaller slits 106 and 107 and they are attached to top member 50 by curved perforations 108 and 110, straight perforations 109 and 111, and fold lines 112 and 114.

Forming container section 4 and lid section 5 for transporting pizza or like food in food transporting box 1 is fairly standard for pizza boxes in the industry. This includes folding side walls 12 and 14, front wall 36, and front flaps 20 and 22 such that they are positioned perpendicularly to floor member 6 of container section 4, aligning the front flaps adjacent to front wall 38, and then folding front wall 36 over the front flaps and locking that front wall in place by inserting tabs 46 and 48 into slotted openings 8 and 10, thus forming the completed front wall of container section 4. Rear wall 68 of lid section 5 is folded such that it is at substantially a 90 degree angle with top member 50 of the lid section, which is then rotated over container section 4, about fold lines 54 and 56 of intermediate section 52, such that the rear wall is adjacent to front wall 38 of the container section, thus covering and enclosing the pizza within transporting box 1. Once again, these box components and folding techniques, as they relate to basic pizza type box containers, are fairly standard in the industry. However, the present invention improves upon this standard box by providing the new and unique configuration for converting the box from a food transporting container to an elevated food tray.

Figure 2:
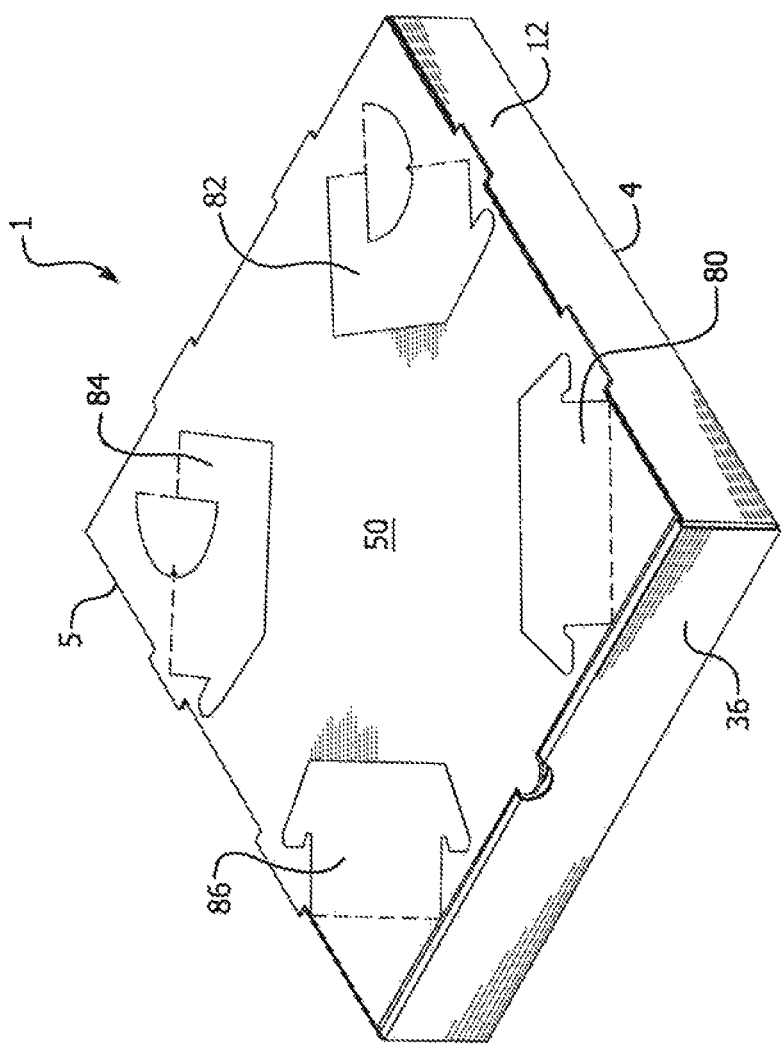
FIG. 2 is a perspective view of the convertible food transporting box of the present invention in its closed position.

In its pizza transporting configuration, box 1 takes the appearance of a standard pizza box. In this first position, shown in FIG. 2, lid section 5 substantially covers floor member 6 of container section 4 and inserts 80, 82, 84, and 86 are flush with and in the same transverse plane as top member 50. And, as such, the inserts remain located within and form a portion of lid section 5. Intermediate wall member 52 acts strictly as a rear wall for box 1.

Box 1 is easily convertible from this first position to its second, elevated food tray position, wherein lid section 5 is located underneath container section 4 and the entire box is elevated and supported by inserts 80, 82, 84, and 86, which act as leg means for the newly configured food tray.

Figure 3:
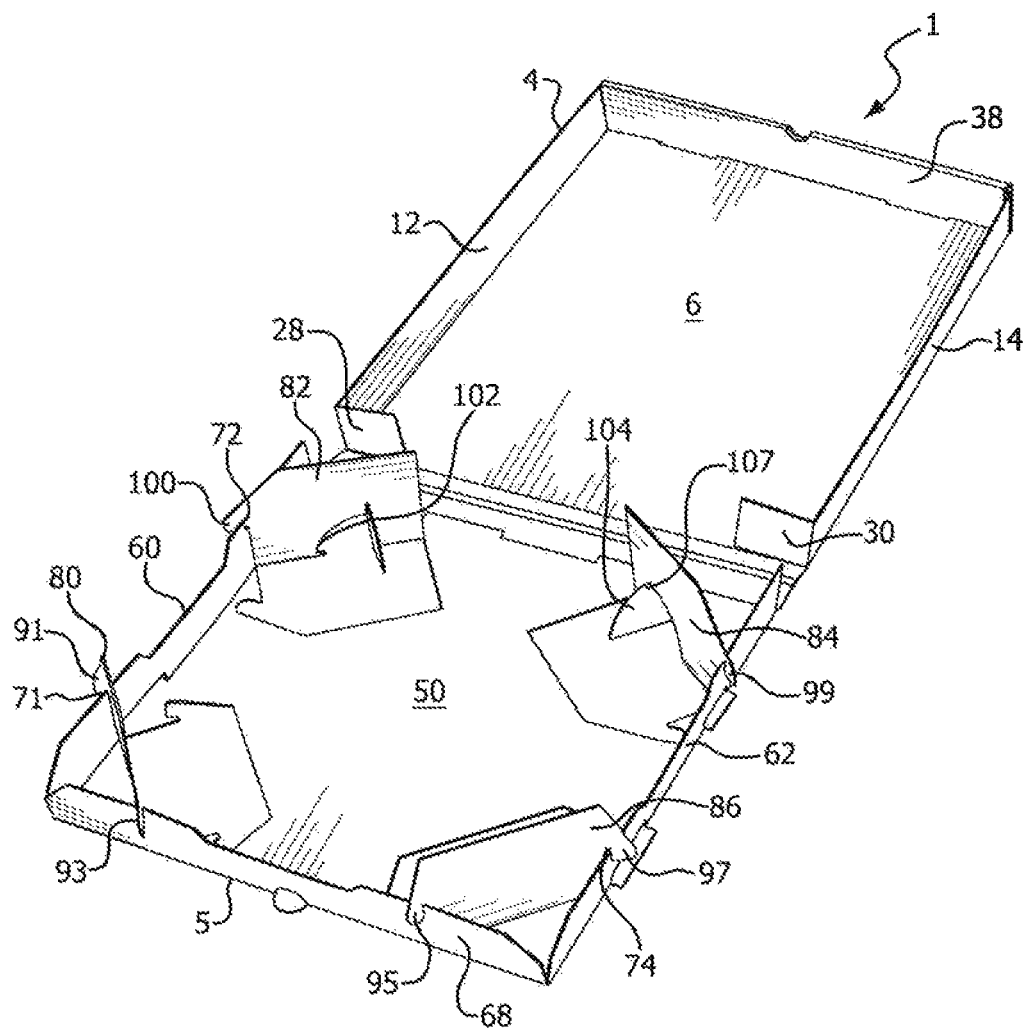
FIG. 3 is a perspective view of the blank of the convertible food transporting box of the present invention, showing the inserts of the lid section assembled.

The conversion from a box to a food tray is begun by opening box 1 and pushing or punching inserts 80, 82, 84, and 86 outward of top member 50, as shown in FIG. 3. This is easily accomplished due to the presence of perforations 87, 88, and 89 surrounding insert 80, and the identically placed perforations, shown but not referenced, around the other inserts 82, 84, and 86. The inserts are then folded via their fold lines 90, 92, 94, and 96, such that they are perpendicular to top member 50. Support tabs 102 and 104 are pushed or punched outward, a step made easy by perforations 108 and 109 and 110 and 111. The support tabs are then rotated upwards at fold lines 112 and 114 such that they are perpendicular to top member 50 and their slits 106 and 107 interconnect with the lower curved surfaces of inserts 82 and 84, as best shown in FIGS. 3 and 4.

Side walls 60 and 62 are rotated upward via fold lines 64 and 66, to allow inserts 80, 82, 84 and 86 to be secured in position as follows: locking tab 91 of insert 80 interlocks with slit 71 in side wall 60, locking tab 93 of insert 80 interlocks with slit 76 in rear wall 68, locking tab 100 of insert 82 interlocks with slit 72 in side wall 60, locking tab 99 of insert 84 interlocks with slit 73 in side wall 62, locking tab 95 of insert 86 interlocks with slit 75 in rear wall 68, and locking tab 97 of insert 86 interlocks with slit 74 in side wall 62.

Figure 4:
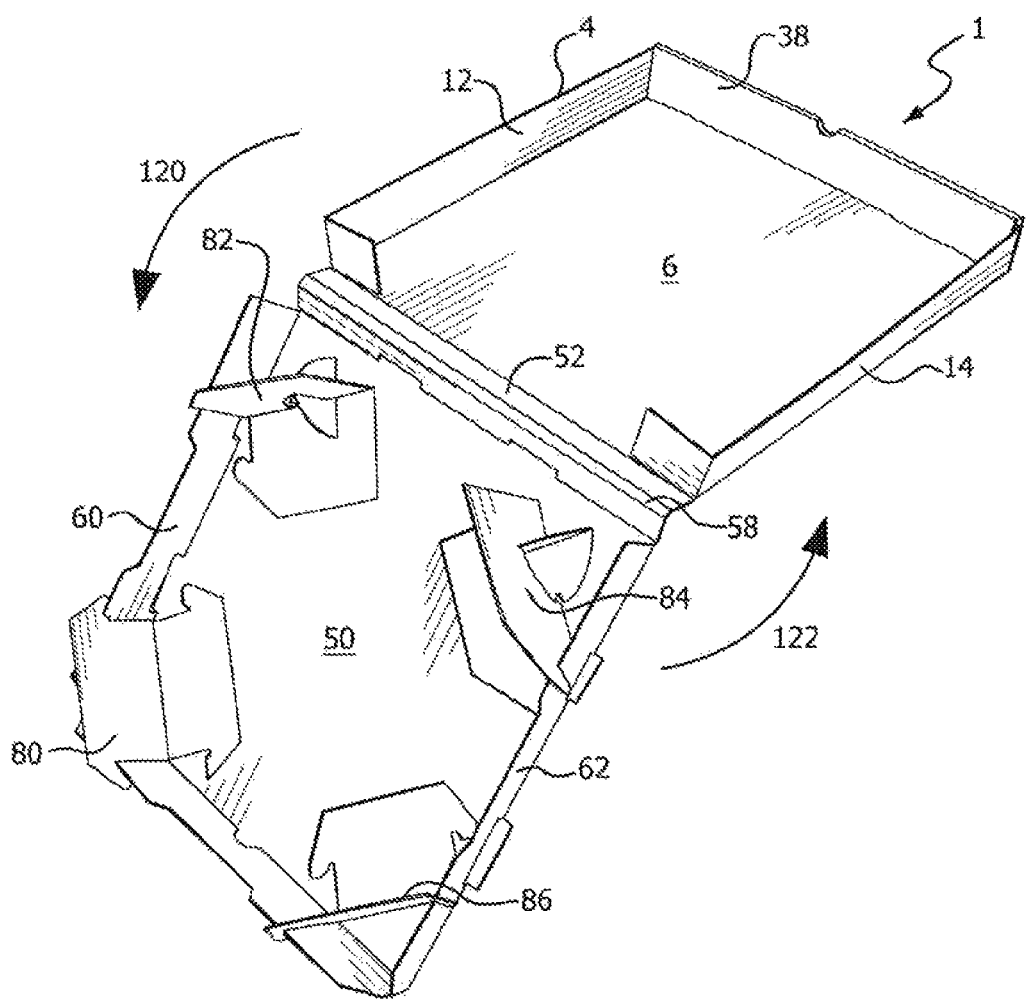
FIG. 4 is a perspective view of the convertible food transporting box of the present invention with its lid section being rotated about its hinge joint.
Figure 5:
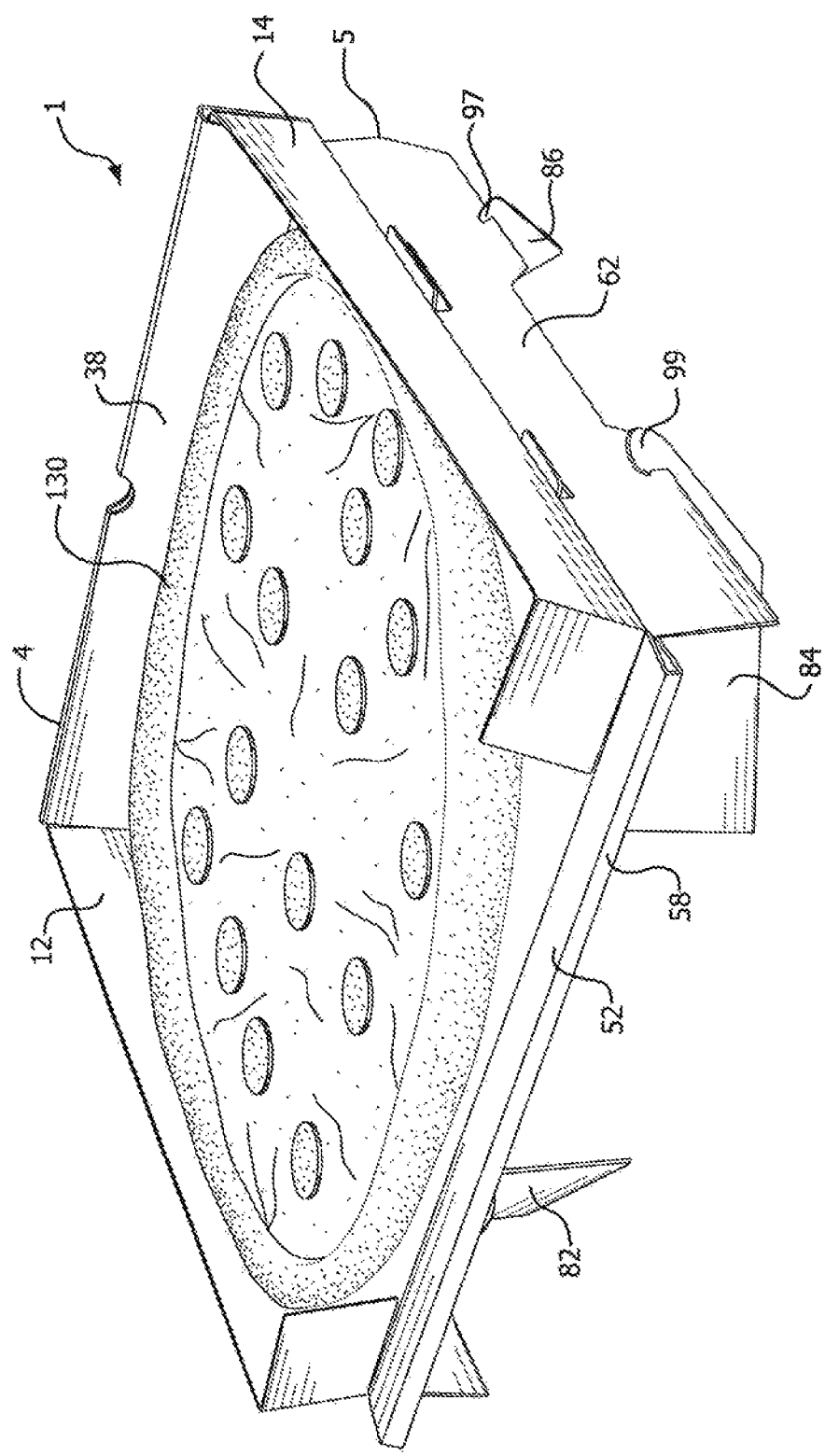
FIG. 5 is a perspective view of the convertible food transporting box of the present invention in its tray configuration supporting a pizza.

Once inserts 80, 82, 84 and 86 have been locked to their adjacent side and rear walls, lid section 5 is rotated downward, away from container section 4, see 120 in FIG. 4, and then upward, toward the container section, see 122, to a position in which the lid section is directly underneath the container section and the inserts are extending outward and downward from the lid section. Movement of lid section 5 around container section 4 is facilitated by double line fold joint 58, which permits easy and ready rotation of the lid section. Box 1, now converted to an elevated tray in which pizza 130 can be displayed and served from container section 4, is placed on a table or similar surface, supported by inserts 80, 82, 84, and 86, now acting as legs for the tray.

Convertible food transporting box 1, as described, is easily and readily manufactured as the single blank, described herein. Most advantageously, that blank can be manufactured at a cost substantially identical to the blanks which are currently used for pizza boxes commonly utilized in the industry. Of course, the convertible food transporting box of the present invention has the added, significant benefit of being easily converted to an accessible tray for displaying and serving pizza.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A self-contained box both for transporting food and for elevating the box to support food in an elevated position, said box comprising:
   a food container section comprising a floor member and side walls, each side wall extending the entire length of the floor member;
   a lid section comprising a top flat section, a single rear wall extending the entire width of the flat top section, and side walls parallel to each other, each side wall extending the entire length of the top flat section;
   an intermediate wall member connecting the food container section to the lid section, the intermediate wall member being located between the side walls of both the food container section and the lid section, wherein the top flat section is completely circumscribed by the single rear wall, the two parallel side walls, and the intermediate wall member;
   a joint extending the length of the intermediate wall member for facilitating the rotation of the lid section from a first position in which the lid section substantially covers the floor member of the container section, to a second position in which the lid section is underneath the container section to support both the container section and the lid section; and
   a plurality of perforated inserts located within and forming a portion of the top flat section when the lid section is in the first position and when the lid section is in the second position, the inserts are punched out from within the top flat section to extend outwardly and downwardly from said top flat section to support the container section and lid section.

2. The self-contained box as in claim 1 wherein the joint comprises a fold line joint.

3. The self-contained box as in claim 2 wherein the fold line joint comprises a double line fold joint.

4. The self-contained box as in claim 1 further comprising locking tabs for maintaining the container section and the lid section in the second position.

5. A one piece flat blank constituting a food transport and food elevating box, said blank comprising:

a container section having a floor section and side wall sections connected by fold lines to the container section, each side wall section extending the entire length of the floor member;

a lid section comprising a top flat section, a single rear wall section connected by a fold line to and extending the entire width of the flat top section, two side wall sections parallel to each other, each side wall section connected by a fold line to and extending the entire length of the top flat section;

an intermediate section connected to the floor section by a first fold line and connected to the top flat section by a second fold line, said intermediate section extending perpendicularly to the side wall sections the entire widths of the floor member and the top flat section, wherein the top flat section is completely circumscribed by the single rear wall section, the two parallel side wall sections, and the intermediate section; and a plurality of perforated inserts located within and forming a portion of the top flat section, the inserts being configured to be located in the same transverse plane as the top flat section in a first position and to be punched out from within the top flat section to extend outwardly and downwardly from said top flat section in a second position.

6. The blank as in claim 5 wherein each insert comprises locking tabs.

7. The blank as in claim 5 further comprising insert support tabs forming a part of the lid section and extending into at least two of the inserts.

8. A self-contained box both for transporting food and for elevating the box to support food in an elevated position, said box comprising:

a food container section comprising a floor member and side walls, each side wall extending the entire length of the floor member;

a lid section comprising a top flat section, a single rear wall connected to and extending the entire width of the top flat section, and side walls, each side wall connected to and extending the entire length of the top flat section wherein only the single rear wall, the top flat section side walls and the joint member circumscribe the top flat section; and a joint member connecting the food container section to the lid section, the joint member being located between the side walls of both the food container section and the lid section and extending the entire width of the floor member and the top flat section, said joint member facilitating the rotation of the lid section from a first position in which the lid section substantially covers the floor member of the container section, to a second position in which the lid section is underneath the container section to support both the container section and the lid section, wherein when the lid section is in the first position, the top flat section comprises a plurality of perforated inserts located within and forming a portion of the top flat section and when the lid is in the second position, the inserts are punched out from within the top flat section to extend outwardly and downwardly from said top flat section to support both the container section and lid section.

9. The self-contained box as in claim 8 wherein the joint member comprises an intermediate wall member extending the entire width of the floor member and the top flat section and a fold line joint extending the length of the intermediate wall member.

10. The self-contained box as in claim 9 wherein the fold line joint comprises a double line fold joint.

11. The self-contained box as in claim 8 wherein each insert comprises lock tabs for maintaining the container section and the lid section in the second position.

* * * * *